(12) United States Patent
Mathur et al.

(10) Patent No.: US 12,647,329 B2
(45) Date of Patent: Jun. 2, 2026

(54) DATA CENTER MAPPING METHOD, DEVICE, AND COMPUTER-READABLE MEDIUM

(71) Applicant: RAKUTEN SYMPHONY, INC., Tokyo (JP)

(72) Inventors: Harsh Mathur, Indore (IN); Shivani Bansal, Indore (IN); Anmol Choudhary, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 451 days.

(21) Appl. No.: 18/005,854

(22) PCT Filed: Nov. 15, 2022

(86) PCT No.: PCT/US2022/049927
§ 371 (c)(1),
(2) Date: Jan. 18, 2023

(87) PCT Pub. No.: WO2024/107177
PCT Pub. Date: May 23, 2024

(65) Prior Publication Data
US 2025/0097121 A1     Mar. 20, 2025

(51) Int. Cl.
*G06F 3/048* (2013.01)
*H04L 41/22* (2022.01)

(52) U.S. Cl.
CPC .................................. *H04L 41/22* (2013.01)

(58) Field of Classification Search
CPC ...................................................... H04L 41/22
See application file for complete search history.

(56) References Cited

U.S. PATENT DOCUMENTS

| | | | | |
|---|---|---|---|---|
| 7,222,147 | B1 * | 5/2007 | Black | H04L 41/0803 709/200 |
| 8,799,269 | B2 * | 8/2014 | Friedlander | G06F 16/90335 707/750 |
| 9,396,216 | B2 * | 7/2016 | Barreto | G06F 16/1734 |
| 9,769,085 | B2 * | 9/2017 | Laribi | G06F 11/3006 |
| 9,965,498 | B2 * | 5/2018 | Coutts | G06F 16/217 |
| 9,973,566 | B2 * | 5/2018 | Hebert | G06F 9/4843 |
| 11,093,269 | B1 * | 8/2021 | Yemini | H04L 67/12 |
| 11,526,408 | B2 * | 12/2022 | Karr | G06F 3/065 |
| 11,575,651 | B2 * | 2/2023 | Levin | H04L 41/0897 |
| 12,020,222 | B1 * | 6/2024 | Bulusu | G06Q 20/102 |
| 12,131,056 | B2 * | 10/2024 | Darji | H04L 41/5019 |
| 12,206,707 | B2 * | 1/2025 | Crabtree | H04L 63/1433 |
| 12,517,770 | B1 * | 1/2026 | Nguyen | G06F 9/5083 |

(Continued)

*Primary Examiner* — David Phantana-angkool

(74) *Attorney, Agent, or Firm* — HAUPTMAN HAM, LLP

(57) ABSTRACT
A computer-implemented method includes receiving information corresponding to a data center, the information including an identifier of a type of the data center, identifying a server cluster type according to the data center type, outputting, to a user interface, a predefined list configured to obtain mapping information from a user, wherein the predefined list and mapping information are structured based on the server cluster type, receiving the mapping information from the user interface in response to the predefined list, wherein the mapping information includes one or more identifiers of material installed in the data center, and storing the structured mapping information in a storage device.

20 Claims, 14 Drawing Sheets

700C—

| Data Center Group Center | DC Type D+XC | Data Center ID ID | Location LOC | Created On 2022-04-19 | Status Drafted |
|---|---|---|---|---|---|

Data Center > GC >   [Search Name]   GC Details⌄

Overview | Physical | Logical | Cell Site | Services | Notification

Server (4)
Rack (2)
Switch (5)
Router (0)
WDM (0)
POD (2)

Displaying 5 of 5

| Status | Host Name | NE Type | Domain | Vendor | |
|---|---|---|---|---|---|
| ● Planned | HN | SWITCH | TRANSPORT | VN | |
| ● Planned | HN | SWITCH | TRANSPORT | VN | |
| ● Planned | HN | SWITCH | TRANSPORT | VN | |
| ● Planned | HN | SWITCH | TRANSPORT | VN | |
| ● Planned | HN | SWITCH | TRANSPORT | VN | |

(56)                    References Cited

U.S. PATENT DOCUMENTS

| | | | |
|---|---|---|---|
| 2005/0125492 A1* | 6/2005 | Yu | H04L 41/0856 |
| | | | 709/203 |
| 2008/0205289 A1* | 8/2008 | Conoboy | H04L 41/0853 |
| | | | 370/465 |
| 2014/0074850 A1* | 3/2014 | Noel | G06N 5/022 |
| | | | 707/741 |
| 2016/0092207 A1* | 3/2016 | Chhatwal | G06F 8/65 |
| | | | 717/121 |
| 2020/0396128 A1* | 12/2020 | Tseng | H04L 41/145 |

* cited by examiner

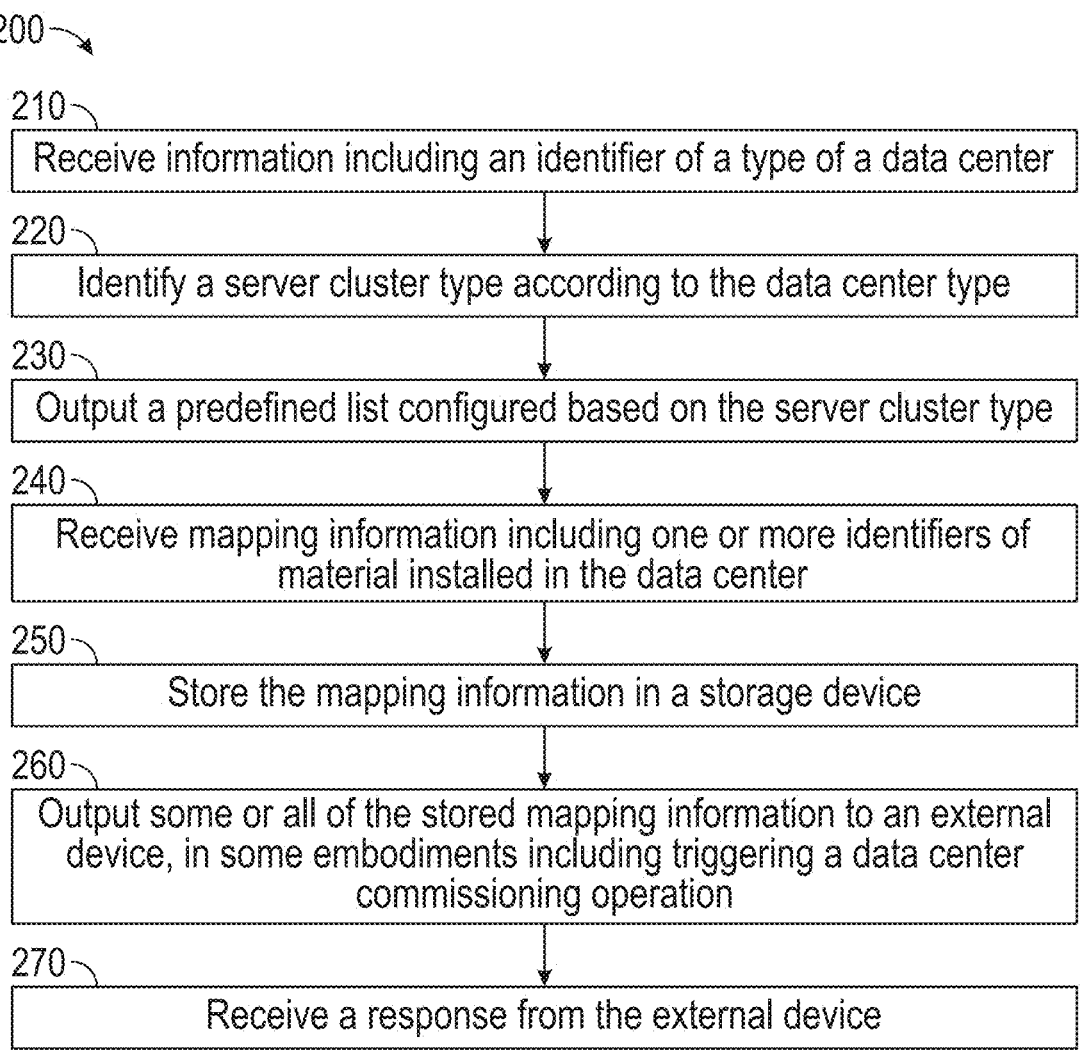

200

210
Receive information including an identifier of a type of a data center

220
Identify a server cluster type according to the data center type

230
Output a predefined list configured based on the server cluster type

240
Receive mapping information including one or more identifiers of material installed in the data center 250
Store the mapping information in a storage device 260
Output some or all of the stored mapping information to an external device, in some embodiments including triggering a data center commissioning operation 270
Receive a response from the external device

Commissioning Process

Select POD
& Trigger

POD is Selected
from the List

F

Based on GC
Type Data
is Mapped

Ⓐ → RAN/TOR     Cloud/Server     Send
Request for
Commissioning → Ⓑ

**TOR Material
Mapped with POD**

N9K-C93180YC
-FX35(FH-TCR)

N9K-C93180YC
-FX35(FH-TCR)

**Server Material
Mapped with POD**

R5GC
(4Sleds)

R5GC
(3Sleds)

R5GC
(3Sleds)

Ⓒ

Fail Response for TOR/RAN     Ⓓ

Ⓔ ———————————————————————————— Ⓔ

| Material Name | Material Code | Host Name | Serial Number* | MAC Address* | Rack Name | Rack Number |
|---|---|---|---|---|---|---|
| MN | MC | HN | SN | MAC | RM#009 | 9 |
| MN | MC | HN | SN | MAC | RM#009 | 9 |

Sleds Information

| Material Name | Material Code | Chassis S/N | Component Name | Sled Number | Host Name | S/N* | BMC MAC Address* | Rack Name | Rack Number | Status |
|---|---|---|---|---|---|---|---|---|---|---|
| MN | MC | SN | S5I seld | NODE#0 | HN | SN | MAC | RM#009 | 9 | Registered |
| MN | MC | SN | S5I seld | NODE#1 | HN | SN | MAC | RM#009 | 9 | Registered |
| MN | MC | SN | S5I seld | NODE#2 | HN | SN | MAC | RM#009 | 9 | Registered |
| MN | MC | SN | S5I seld | NODE#3 | HN | SN | MAC | RM#009 | 9 | Registered |
| MN | MC | SN | S5I seld | NODE#0 | HN | SN | MAC | RM#010 | 10 | Registered |

Figure 7A:
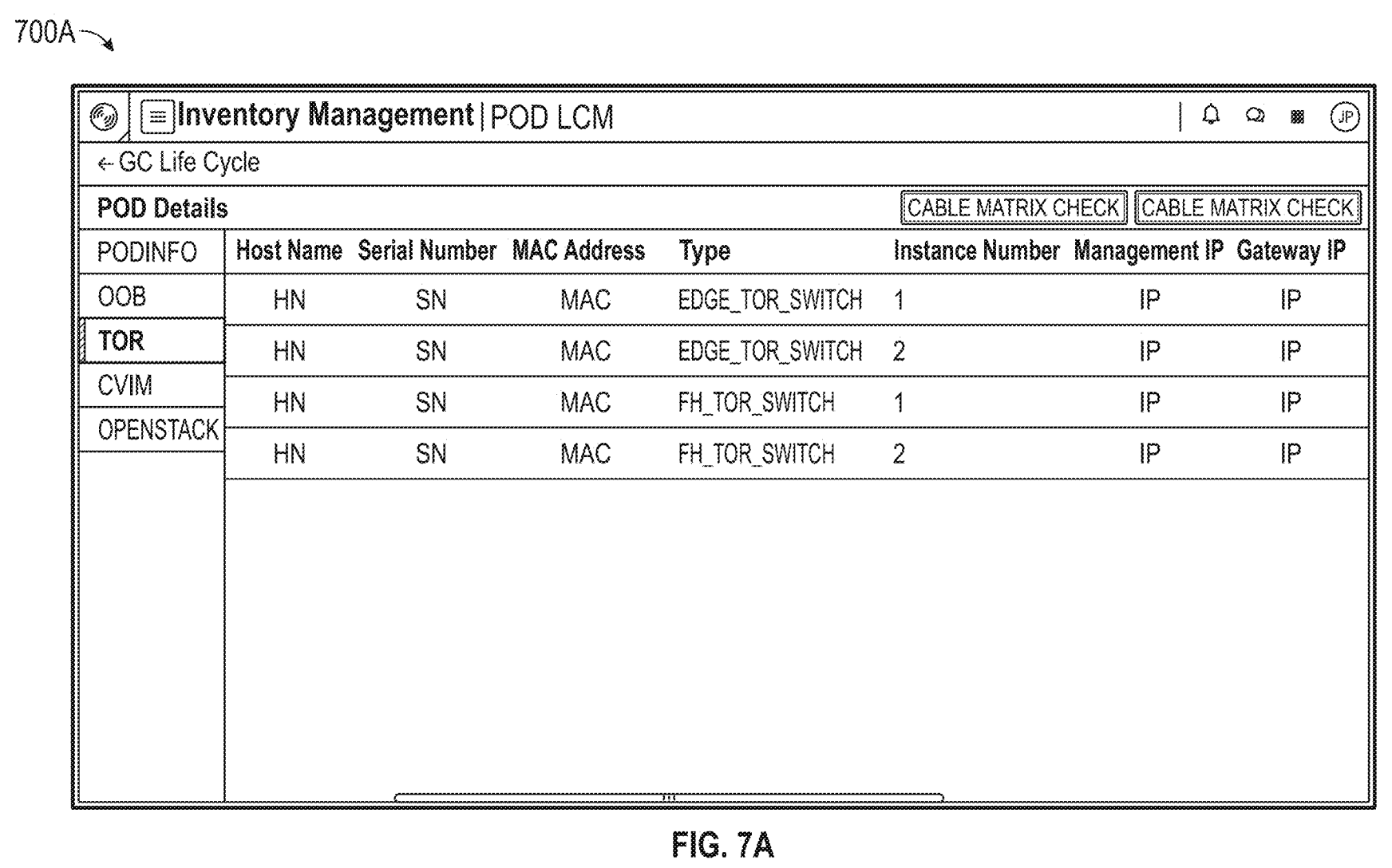

| ← GC Life Cycle | | | | | | | |
| POD Details | | | | | CABLE MATRIX CHECK | CABLE MATRIX CHECK | |
| PODINFO | Host Name | Serial Number | MAC Address | Type | Instance Number | Management IP | Gateway IP |
| OOB | HN | SN | MAC | EDGE_TOR_SWITCH | 1 | IP | IP |
| TOR | HN | SN | MAC | EDGE_TOR_SWITCH | 2 | IP | IP |
| CVIM | HN | SN | MAC | FH_TOR_SWITCH | 1 | IP | IP |
| OPENSTACK | HN | SN | MAC | FH_TOR_SWITCH | 2 | IP | IP |

Inventory Management | POD LCM

Figure 7B:
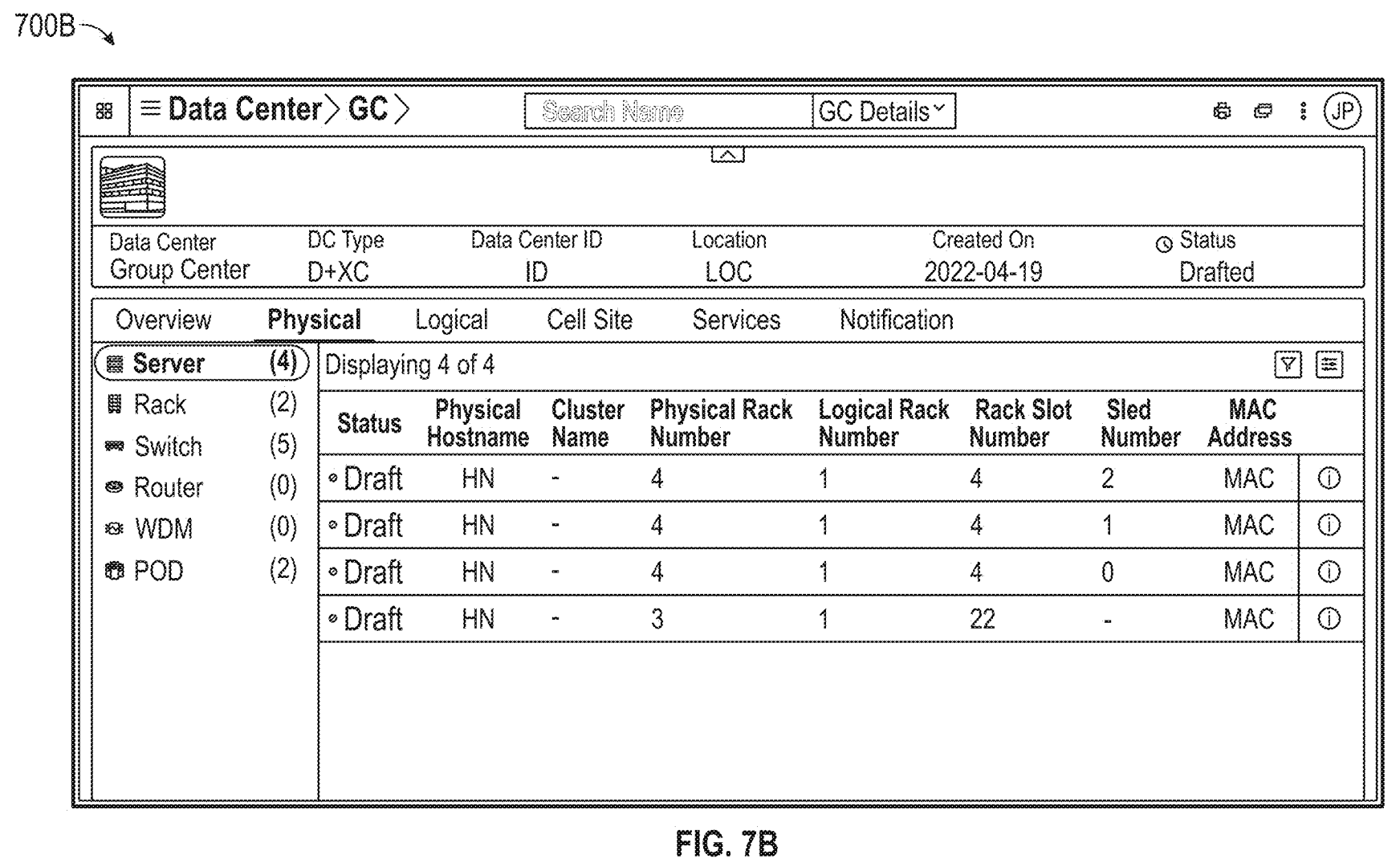

88    ≡ Data Center〉GC 〉    Search Name    GC Details ⌄    ⊕ ⌨ ⋮    JP

| Data Center Group Center | DC Type D+XC | Data Center ID ID | Location LOC | Created On 2022-04-19 | ⊘ Status Drafted |

Overview    Physical    Logical    Cell Site    Services    Notification

| ▤ Server | (4) |
| ▤ Rack | (2) |
| ▥ Switch | (5) |
| ✏ Router | (0) |
| ⚙ WDM | (0) |
| ⬤ POD | (2) |

Displaying 4 of 4    ▽  ▤

| Status | Physical Hostname | Cluster Name | Physical Rack Number | Logical Rack Number | Rack Slot Number | Sled Number | MAC Address |
|---|---|---|---|---|---|---|---|
| ● Draft | HN | - | 4 | 1 | 4 | 2 | MAC ⊖ |
| ● Draft | HN | - | 4 | 1 | 4 | 1 | MAC ⊖ |
| ● Draft | HN | - | 4 | 1 | 4 | 0 | MAC ⊖ |
| ● Draft | HN | - | 3 | 1 | 22 | - | MAC ⊖ |

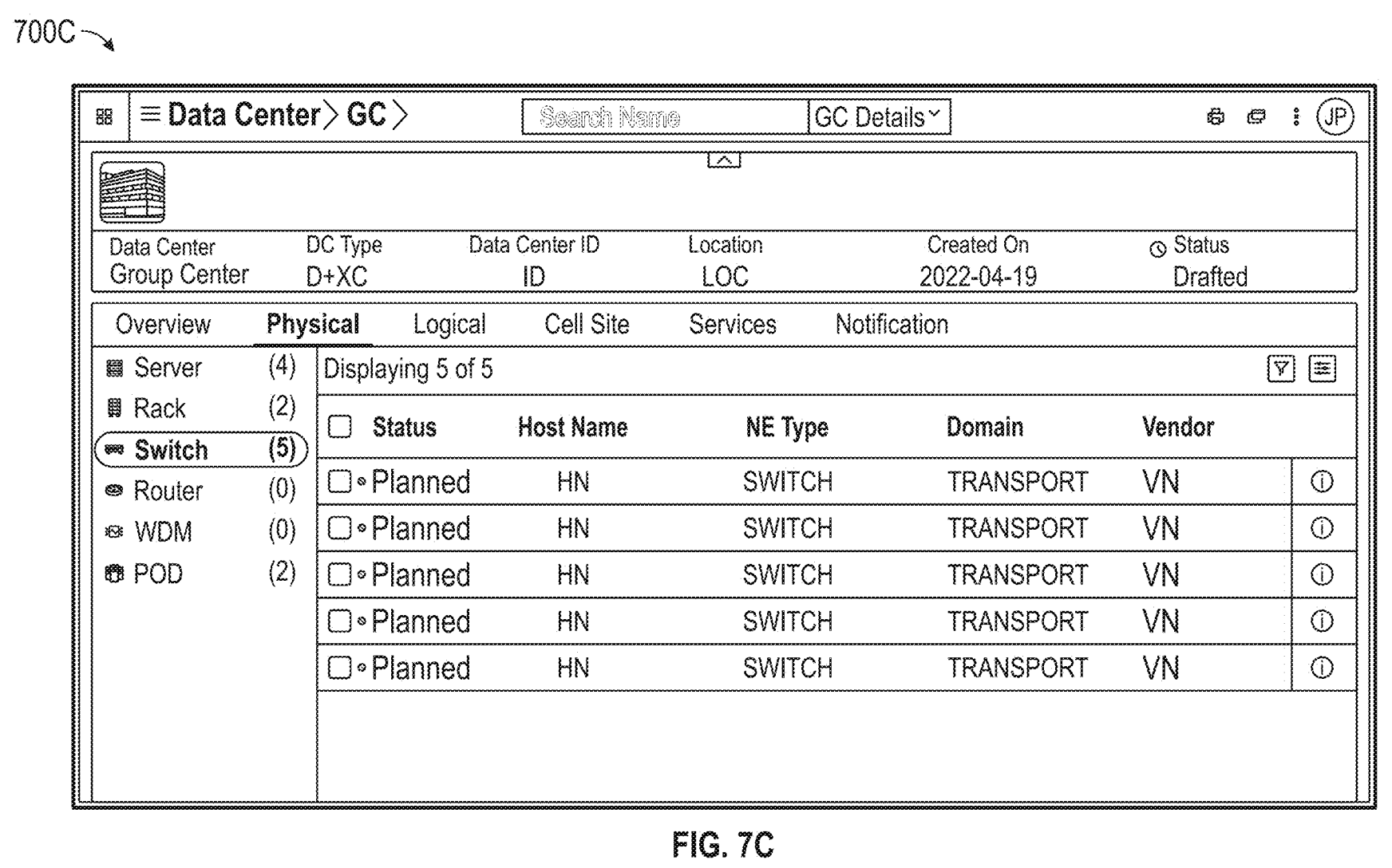

| ☰ Data Center〉GC〉 | | | | | | Search Name | | GC Details ∨ | | ⊕ ⊜ ⋮ ⑂ |
|---|---|---|---|---|---|---|---|---|---|---|

| Data Center<br>Group Center | DC Type<br>D+XC | | Data Center ID<br>ID | | Location<br>LOC | | Created On<br>2022-04-19 | | ⊙ Status<br>Drafted |
|---|---|---|---|---|---|---|---|---|---|

| Overview | Physical | Logical | Cell Site | Services | Notification |
|---|---|---|---|---|---|

| | | | | | | |
|---|---|---|---|---|---|---|
| ▦ Server | (4) | Displaying 5 of 5 | | | | ▽ ⊟ |
| ▦ Rack | (2) | | | | | |
| ▭ Switch | (5) | ☐ Status | Host Name | NE Type | Domain | Vendor |
| ⬡ Router | (0) | ☐ ◦ Planned | HN | SWITCH | TRANSPORT | VN ⊝ |
| ◈ WDM | (0) | ☐ ◦ Planned | HN | SWITCH | TRANSPORT | VN ⊝ |
| ▣ POD | (2) | ☐ ◦ Planned | HN | SWITCH | TRANSPORT | VN ⊝ |
| | | ☐ ◦ Planned | HN | SWITCH | TRANSPORT | VN ⊝ |
| | | ☐ ◦ Planned | HN | SWITCH | TRANSPORT | VN ⊝ |

FIG. 7C

DATA CENTER MAPPING METHOD, DEVICE, AND COMPUTER-READABLE MEDIUM

RELATED APPLICATIONS

The present application is a National Phase of International Application No. PCT/US2022/049927, filed Nov. 15, 2022.

TECHNICAL FIELD

This description relates to a method, device, and non-transitory computer-readable medium directed to automated structuring and mapping of data center information used to onboard data centers into communication networks.

BACKGROUND

Telecom (e.g., wireless, cellular, etc.) and other application workloads are increasingly being transitioned to cloud native applications deployed on data centers that include multiple server clusters. The server clusters are capable of having a variety of resources that are often shared among multiple applications.

SUMMARY

In some embodiments, a computer-implemented method includes receiving information corresponding to a data center, wherein the information includes an identifier of a type of the data center, identifying a server cluster type according to the data center type, outputting, to a user interface, a predefined list configured to obtain mapping information from a user, wherein the predefined list and mapping information are structured based on the server cluster type, receiving the mapping information from the user interface in response to the predefined list, wherein the mapping information includes one or more identifiers of material installed in the data center, and storing the structured mapping information in a storage device.

In some embodiments, a device includes a user interface, a memory having non-transitory instructions stored therein, and a processor coupled to the memory, and being configured to execute the instructions, thereby causing the device to receive information corresponding to a data center, wherein the information includes an identifier of a type of the data center, identify a server cluster type according to the data center type, output, to a user interface, a predefined list configured to obtain mapping information from a user, wherein the predefined list and mapping information are structured based on the server cluster type, receive the mapping information from the user interface in response to the predefined list, wherein the mapping information includes one or more identifiers of material installed in the data center, and store the structured mapping information in a storage device.

In some embodiments, a computer-readable medium includes instructions executable by a controller of a device to cause the controller to perform operations including receiving information corresponding to a data center, wherein the information includes an identifier of a type of the data center, identifying a server cluster type according to the data center type, outputting, to a user interface, a predefined list configured to obtain mapping information from a user, wherein the predefined list and mapping information are structured based on the server cluster type, receiving the mapping information from the user interface in response to the predefined list, wherein the mapping information includes one or more identifiers of material installed in the data center, and storing the structured mapping information in a storage device.

BRIEF DESCRIPTION OF DRAWINGS

Aspects of the present disclosure are best understood from the following detailed description when read with the accompanying figures. In accordance with the standard practice in the industry, various features are not drawn to scale. In fact, the dimensions of the various features are arbitrarily increased or reduced for clarity of discussion.

FIG. 2 is a flowchart of a data center mapping method, in accordance with some embodiments.

FIGS. 6-7C are non-limiting examples of graphical user interfaces, in accordance with some embodiments.

DETAILED DESCRIPTION

Figure 1A:
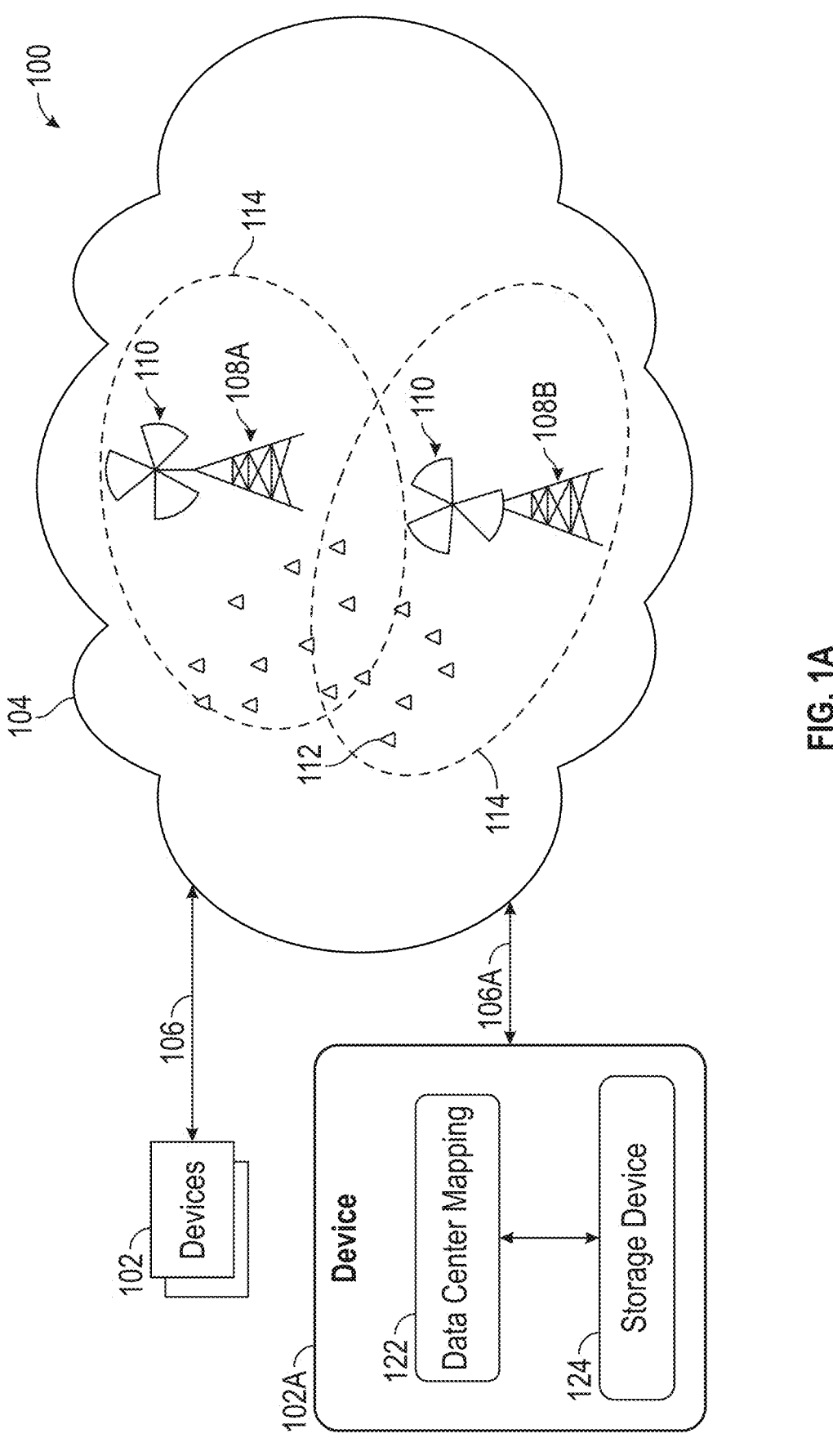
FIGS. 1A and 1B are block diagrams of a communication system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation or position of a first feature over or on a second feature in the description that follows include embodiments in which the first and second features are formed or positioned in direct contact and include embodiments in which additional features are formed or positioned between the first and second features, such that the first and second features are in indirect contact. In addition, the present disclosure repeats reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of a system or object in use or operation in addition to the orientation depicted in the figures. The system is otherwise oriented (rotated 90 degrees or at other orientations) and the spatially relative descriptors used herein likewise are interpreted accordingly.

In various embodiments, a method, device, and computer readable medium are directed to automatically receiving information corresponding to a data center, the information including an identifier of a type of the data center, and identifying a server cluster type according to the data center type. A predefined list is structured based on the server cluster type and configured to obtain mapping information from a user is output to a user interface, and the mapping information is received from the user interface in response to and structured by the predefined list. The structured mapping information includes one or more identifiers of material, e.g., servers, racks, or networking equipment, installed in the data center and is stored in a storage device.

In some embodiments, some or all of the structured data center mapping information is output to an external device, and in some embodiments, a response to the request is received from the external device, the response including an indicator of success or failure, e.g., based on one material category of a plurality of material categories corresponding to the mapping information. In some embodiments, outputting the structured data center mapping information (and receiving the response in some embodiments) includes triggering the external device to commission a portion or all of the data center as an active communication system element.

By executing some or all of the operations of the present disclosure, a communication system is able to access data center mapping information including data records automatically structured in accordance with data center type. Compare to approaches in which data center mapping information is otherwise handled, such access is achievable using fewer system resources, e.g., through reduced code complexity, error handling activities, and user interactions. The communication system is thereby able to perform commissioning and other operations more efficiently compared to such other approaches.

Figure 1B:
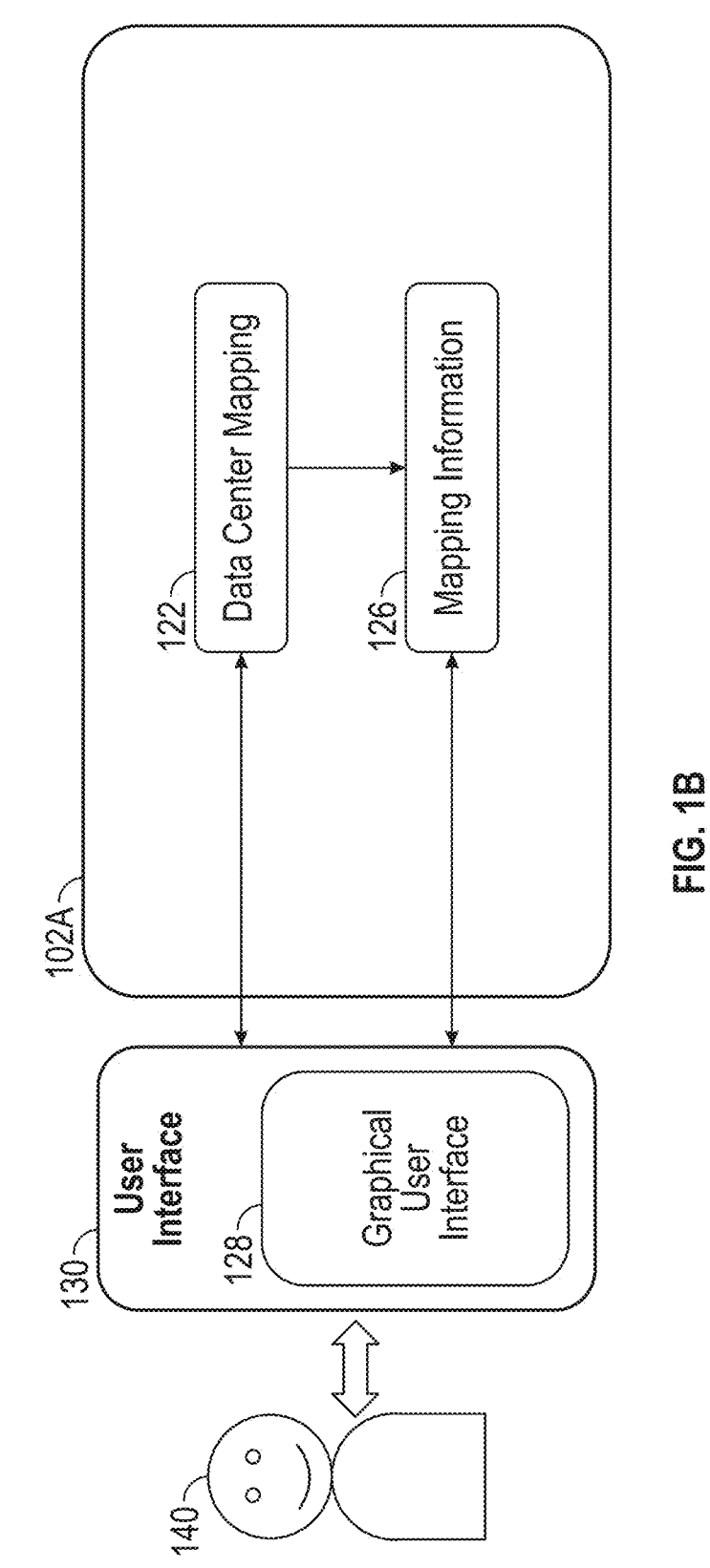

FIGS. 1A and 1B are block diagrams of a communication system 100 (hereinafter referred to as "system 100"), in accordance with some embodiments.

System 100 includes a plurality of devices 102 coupled to a network 104 by a plurality of links 106. Network 104 is coupled to a device 102A of plurality of devices 102 by a link 106A of plurality of links 106. Plurality of devices 102 including device 102A are coupled to each other through network 104 and plurality of links 106 including link 106A.

Figure 8:
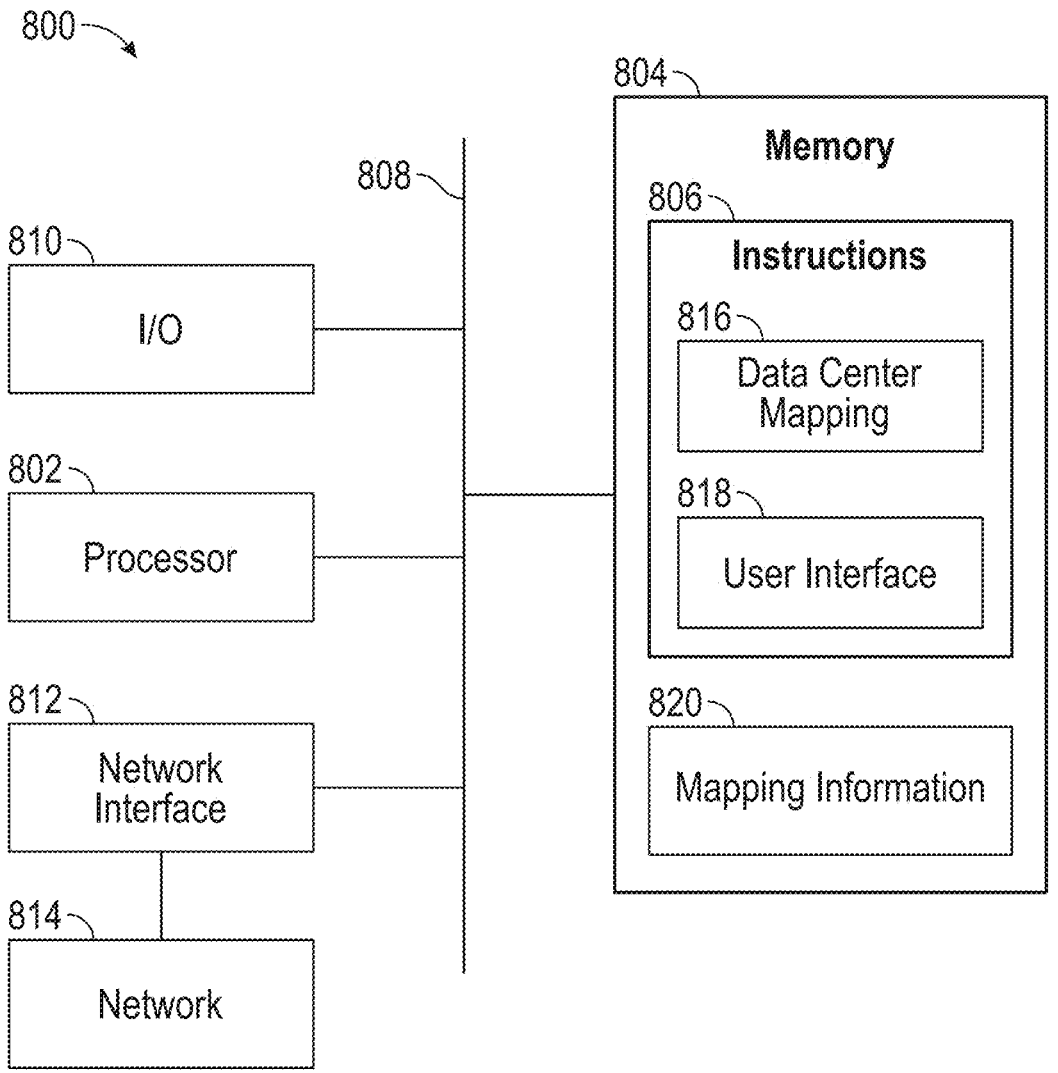
FIG. 8 is a diagram of a processor-based device, in accordance with some embodiments.

In various embodiments, the devices of plurality of devices 102 correspond to combinations of computing devices, computing systems, servers, server clusters, and/or pluralities of server clusters also referred to as server farms or data centers in some embodiments. In some embodiments, a device 800 discussed below with respect to FIG. 8 is an embodiment of one or more of plurality of devices 102.

In some embodiments, one or more of plurality of devices 102 is a type of mobile terminal, fixed terminal, or portable terminal including a desktop computer, laptop computer, notebook computer, netbook computer, tablet computer, wearable circuitry, mobile handset, server, gaming console, or combination thereof. In some embodiments, one or more of plurality of devices 102 includes a display by which a user interface is displayed.

Other configurations and/or types of devices in plurality of devices 102 are within the scope of the present disclosure.

In the embodiment depicted in FIG. 1A, device 102A includes a data center mapping 122 and a storage device 124, each discussed below.

Network 104 is one or more interconnected devices configured to provide electronic communications between and among the interconnected devices and plurality of devices 102, in some cases through plurality of links 106. In some embodiments, network 104 corresponds to the internet.

In some embodiments, network 104 includes or represents a radio-access network (RAN), a mobile telecommunication system that implements a radio access technology and resides between devices such as mobile phones, computers, or other devices and provides connection with plurality of devices 102.

In some embodiments, one or more of the interconnected devices of network 104 and/or plurality of devices 102 are configured as one or more of a local area network (LAN), a wide area network (WAN), a metropolitan area network (MAN), an internet area network (IAN), a campus area network (CAN), or a virtual private network (VPN). In some embodiments, one or more of the interconnected devices of network 104 and/or plurality of devices 102 are configured as a backbone or core network (CN), a part of a computer network which interconnects networks, providing a path for the exchange of information between different LANs, WANs, etc.

In some embodiments, some of the interconnected devices of network 104 and/or plurality of devices 102 are configured as server clusters, e.g., included in a data center. In some embodiments, the server clusters are part of a cloud computing environment.

In the embodiment depicted in FIG. 1A, network 104 includes base stations 108A and 108B (hereinafter base station 108), each including an antenna 110 wirelessly connected to one or more instances of user equipment (UE) 112 located in a geographic coverage area 114.

In some embodiments, network 104 is a global system for mobile communications (GSM) RAN, a GSM/EDGE RAN, a universal mobile telecommunications system (UMTS) RAN (UTRAN), an evolved universal terrestrial radio access network (E-UTRAN, open RAN (O-RAN), or cloud-RAN (C-RAN). In some embodiments, network 104 resides between user equipment 112 (e.g., mobile phone, a computer, or any remotely controlled machine) and one or more core networks.

In some embodiments, network 104 is a hierarchical telecommunications network including one or more intermediate link(s), also referred to as backhaul portions in some embodiments, between a RAN and one or more core networks. The two main methods of mobile backhaul implementations are fiber-based backhaul and wireless point-to-point backhaul. Other methods, such as copper-based wireline, satellite communications and point-to-multipoint wireless technologies are being phased out as capacity and latency requirements become higher in 4G and 5G networks. Backhaul generally refers to the side of the network that communicates with the global internet. UE 112 communicating with a base station 108 constitute a local subnetwork. In some embodiments, a backhaul includes wired, fiber optic, and/or wireless components including microwave bands and mesh and edge network topologies that use a high-capacity wireless channel to get packets to the microwave or fiber links.

In some embodiments, base stations 108 are lattice or self-supported towers, guyed towers, monopole towers, and concealed towers (e.g., towers designed to resemble trees, cacti, water towers, signs, light standards, and other types of structures). In some embodiments, a base stations 108 is a cellular-enabled mobile device site where antennas and electronic communications equipment are placed, typically on a radio mast, tower, or other raised structure to create a cell (or adjacent cells) in a network. The raised structure typically supports antenna(s) 110 and one or more sets of transmitter/receivers, transceivers, digital signal processors, control electronics, a remote radio head (RRH), primary and backup electrical power sources, and sheltering. Base stations are known by other names such as base transceiver station, mobile phone mast, or cell tower. In some embodiments, base stations are edge devices configured to wirelessly communicate with UEs. The edge device provides an entry point into service provider core networks. Examples include routers, routing switches, integrated access devices (IADs), multiplexers, and a variety of metropolitan area network (MAN) and wide area network (WAN) access devices.

In at least one embodiment, an instance of antenna 110 is a sector antenna, e.g., a directional microwave antenna with a sector-shaped radiation pattern, or a plurality of sector antennae, e.g., configured to have a full-circle coverage. In some embodiments, an instance of antenna 110 is a circular antenna. In some embodiments, an instance of antenna 110 operates at microwave or ultra-high frequency (UHF) frequencies (300 MHz to 3 GHz).

In some embodiments, an instance of UE 112 is a computer or computing system. In some embodiments, an instance of UE 112 has a liquid crystal display (LCD), light-emitting diode (LED) or organic light-emitting diode (OLED) screen interface, such as a graphical user interface providing a touchscreen interface with digital buttons and keyboard or physical buttons along with a physical keyboard. In some embodiments, an instance of UE 112 connects to the internet and interconnects with other devices. In some embodiments, an instance of UE 112 incorporates integrated cameras, the ability to place and receive voice and video telephone calls, video games, and Global Positioning System (GPS) capabilities. In some embodiments, an instance of UE 112 performs as a virtual machine or allows third-party apps to run as a container. In some embodiments, an instance of UE 112 is a computer (such as a tablet computer, netbook, digital media player, digital assistant, graphing calculator, handheld game console, handheld personal computer (PC), laptop, mobile internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), or a smart card.

In various embodiments, a geographic coverage area 114, also referred to as a cell 114 in some embodiments, is a three-dimensional space having a shape and size based on the configurations of the corresponding base station 108, e.g., a power level, and antenna 110, e.g., a number of sectors. In various embodiments, a geographic coverage area 114 has a substantially spherical, hemispherical, conical, columnar, circular or oval disc, or other shape corresponding to a base station and antenna configuration. In various embodiments, one or both of the shape or size of a geographic coverage area 114 varies over time, e.g., based on a variable base station power level and/or a variable number of activated antenna sectors.

In some embodiments, a user of network 104, e.g., a user of one of plurality of devices 102, accesses network 104 through a service provider, a business or organization that sells bandwidth or network access by providing direct internet backbone access to internet service providers and usually access to its network access points (NAPs). Service providers are sometimes referred to as backbone providers or internet providers. Service providers consist of telecommunications companies, data carriers, wireless communications providers, internet service providers, and cable television operators offering high-speed internet access.

Plurality of links 106 include hardware configured to enable electronic communications between plurality of devices 102 and network 104. In various embodiments, one or more of plurality of links 106 is a wired link, e.g., fiber optic, shielded, twisted-pair, or other cabling, or a wireless link type.

In various embodiments, one or more of plurality of links 106 is configured to communicate based on code division multiple access (CDMA), wideband CDMA (WCDMA), time division multiple access (TDMA), frequency division multiple access (FDMA), Orthogonal Frequency Division Multiplexing (OFDM), time division duplexing (TDD), frequency division duplexing (FDD), Bluetooth, Infrared (IR), or the like, or other protocols that may be used in a wired or wireless data communications network. Accordingly, the exemplary illustrations provided herein are not intended to limit the embodiments of the disclosure and are merely to aid in the description of aspects of the embodiments of the disclosure.

In the embodiment depicted in FIGS. 1A and 1B, device 102A including data center mapping 122 is a single instance of plurality of devices 102. In some embodiments, device 102A including data center mapping 122 includes one or more instances of plurality of devices 102.

Data center mapping 122 is one or more sets of instructions configured to be executed on device 102A such that data center mapping information 126 is generated, structured, and stored in storage device 124 in accordance with method 200 discussed below. In some embodiments, data center mapping 122 is configured to run as a standalone program or within one or more sets of instructions. In some embodiments, data center mapping 122 is configured to run on a device of plurality of devices 102 in addition to device 102A.

In some embodiments, data center mapping 122 is included in or configured to interact with an orchestrator. An orchestrator is one or more sets of instructions configured to perform automated configuration, coordination, and management of computer systems and software as related to service-oriented architecture, virtualization, provisioning, converged infrastructure, and dynamic datacenter topics, e.g., by aligning business-based requests with applications, data, and infrastructure of the computer systems and software. In the context of cloud computing, the main difference between workflow automation and orchestration is that workflows are processed and completed as processes within a single domain for automation purposes, whereas orchestration includes a workflow and provides a directed action towards larger goals and objectives. In the cloud computing context, an orchestrator is configured to perform cloud management solutions encompassing frameworks for workflow mapping and management with an overall aim of achieving specific goals and objectives, e.g., by meeting application performance goals using minimized cost and maximized application performance within budget constraints. In some embodiments, an orchestrator is also referred to as a virtual network function (VNF) orchestrator, a CNF orchestrator, a network function virtualization (NFV) orchestrator, or a VNF, CNF, or NFV manager.

In operation, an orchestrator is configured to manage lifecycles of instances of VNFs and CNFs driven by the contents of descriptors and templates, files that include instantiation parameter and operational behavior information, e.g., resource requirements, networking, day zero configuration, key performance indicator (KPI) monitoring, placement policies, lifecycle stages, and scaling rules.

Storage device 124 is one or more computer-readable, non-volatile storage devices, e.g., a memory 804 discussed below with respect to FIG. 8, or a database. In the embodiment depicted in FIG. 1A, storage device 124 is included in device 102A. In some embodiments, storage device 124 is included in one or more devices other than device 102A, e.g., one or more servers or server clusters.

Device 102A includes user interface 130 through which one or more users 140 (represented collectively as user 140 in FIG. 1B) interact with data center mapping 122. In various embodiments, the interactions include one or more of a user 140 communicating information, uploading files, or submitting instructions to data center mapping 122, or data center mapping 122 providing information to the user 140. In some embodiments, device 102A is configured to operate user interface 130 using a set of instructions such as a user interface 818 discussed below with respect to FIG. 8.

In the embodiment depicted in FIG. 1B, user 140 interacts with data center mapping 122 through device 102A and a single instance of user interface 130. In various embodiments, user 140 interacts with data center mapping 122 through one or more of devices 102 instead of or in addition to device 102A, e.g., through multiple instances of user interface 130.

User 140 interacts with data center mapping 122 and user interface 130 through a graphical user interface (GUI) 128, one or more sets of instructions configured to facilitate the interactions through user interface 130. In some embodiments, GUI 128 includes one or more of non-limiting example GUIs 600-700C discussed below with respect to FIGS. 6-7C.

Mapping information 126 is one or more data records generated by data center mapping 122 based on information included in the interactions between user 140 and data center mapping 122 through GUI 128 and user interface 130. The one or more data records are structured to store information usable to identify instances and features of material installed in a data center, e.g., a data center 300 discussed below, as configured by data center mapping 122 according to method 200 discussed below. In some embodiments, one or more data records of mapping information 126 are structured or otherwise configured to be compatible with one or more industry standards, e.g., a database query standard.

By the configuration discussed above, communication system 100 including data center mapping 122 is configured to generate, structure, and store mapping information 126 in accordance with method 200 whereby data center commissioning and maintenance operations are capable of being automatically executed. Communication system 100 is thereby able to access mapping information 126 including data records automatically structured in accordance with data center type. Compare to approaches in which data center mapping information is otherwise handled, such access is achievable using fewer system resources, e.g., through reduced code complexity, error handling activities, and user interactions. Communication system 100 is thereby able to perform commissioning and other operations more efficiently compared to such other approaches.

FIG. 2 is a flowchart of data center mapping method 200, in accordance with some embodiments. Data center mapping method 200, also referred to as method 200 in some embodiments, is operable on a communication system, e.g., communication system 100 discussed above with respect to FIGS. 1A and 1B.

Additional operations may be performed before, during, between, and/or after the operations of method 200 depicted in FIG. 2, and some other operations may only be briefly described herein. In some embodiments, other orders of operations of method 200 are within the scope of the present disclosure. In some embodiments, one or more operations of method 200 are not performed. In some embodiments, the operations of method 200 are included in another method, e.g., a method of commissioning a data center.

In some embodiments, some or all of the operations of method 200 discussed below are capable of being performed automatically, e.g., data center mapping 122 discussed above with respect to FIGS. 1A and 1B and/or by using processing circuitry 802 discussed below with respect to FIG. 8.

At operation 210, in some embodiments, information including an identifier of a type of a data center is received. In some embodiments, receiving the information includes receiving user information from a user interface, e.g., user interface 130 discussed above. In some embodiments, receiving the information includes receiving the information from an external device, e.g., a device 102 discussed above.

Receiving the identifier of the type of data center includes the data center type corresponding to predetermined data center configuration options. In some embodiments, the configuration options include one or more numbers and/or types of point of delivery (POD) modules, or PODs, corresponding to standardized sets of servers, server clusters, racks, network switches, routers, out of band (OOB) devices, and/or other network components having one or more potential configurations in accordance with a specified functional capability. In some embodiments, the configuration options include one or more numbers and/or types of server clusters and/or individual network components.

In some embodiments, receiving the identifier of the type of data center includes the identifier corresponding to one or more industry or technology standards, e.g., a global catalog (GC) identifier or a 4G or 5G technology level.

In some embodiments, receiving the identifier of the type of data center includes receiving a GC type identifier 5G_C of data center 300 discussed below with respect to FIG. 3.

At operation 220, a server cluster type according to the data center type is identified. In some embodiments, identifying the server cluster type includes identifying a single server cluster type according the data center type. In some embodiments, identifying the server cluster type includes identifying one or more server cluster types of a plurality of server cluster types according the data center type. In some embodiments, identifying the server cluster type includes identifying the server cluster type corresponding to a POD, e.g., one POD of a plurality of PODs, according to the data center type.

In some embodiments, identifying the server cluster type includes identifying a number of instances or potential instances of a server cluster type, e.g., numbers of instances or potential instances of each server cluster type of a plurality of server cluster types.

In some embodiments, identifying the server cluster type includes identifying one or both of server cluster types D or F of data center 300 discussed below with respect to FIG. 3.

In some embodiments, identifying the server cluster type includes accessing stored information, e.g., one or more database records, including an association between the server cluster type and the data center type. In some embodiments, accessing the stored information includes accessing information stored in storage device 124 discussed above with respect to FIGS. 1A and 1B.

At operation 230, a predefined list configured based on the server cluster type is output to a user interface. Outputting the predefined list includes the predefined list having a structure including entries corresponding to the numbers and configurations of server cluster instances of each server cluster type identified in operation 220. The entries for each server cluster instance correspond to predetermined data center components, also referred to as material in some embodiments, associated with the server cluster instance.

Outputting the predefined list includes each entry being associated with a record of the corresponding data center component, the record including identifiers of the data center component and of features of the data center component. Non-limiting examples of data center component identifiers include component types, ordinal numbers, names, serial numbers, vendor names, model numbers and/ or slot, rack, room, or other location identifiers of servers, server clusters, racks, network switches, routers, and/or OOB devices. Non-limiting examples of data center component feature identifiers include host names, domain names, media access control (MAC) addresses, IP addresses, service provider identifiers, or the like.

In various embodiments, outputting the predefined list includes outputting a portion of a GUI, e.g., GUI 128 discussed above with respect to FIGS. 1A and 1B, including fields configured to receive and display the record data of each component. In various embodiments, outputting the predefined list includes outputting one or more of a series of prompts, a grid, a series or other plurality of grids, or the like. In some embodiments, outputting the predefined list includes automatically populating one or more fields, e.g., a component type or ordinal number field.

In some embodiments, outputting the predefined list includes performing an iterative process corresponding to a number of potential instances of a server cluster type and/or a number of server cluster types.

Figure 3:
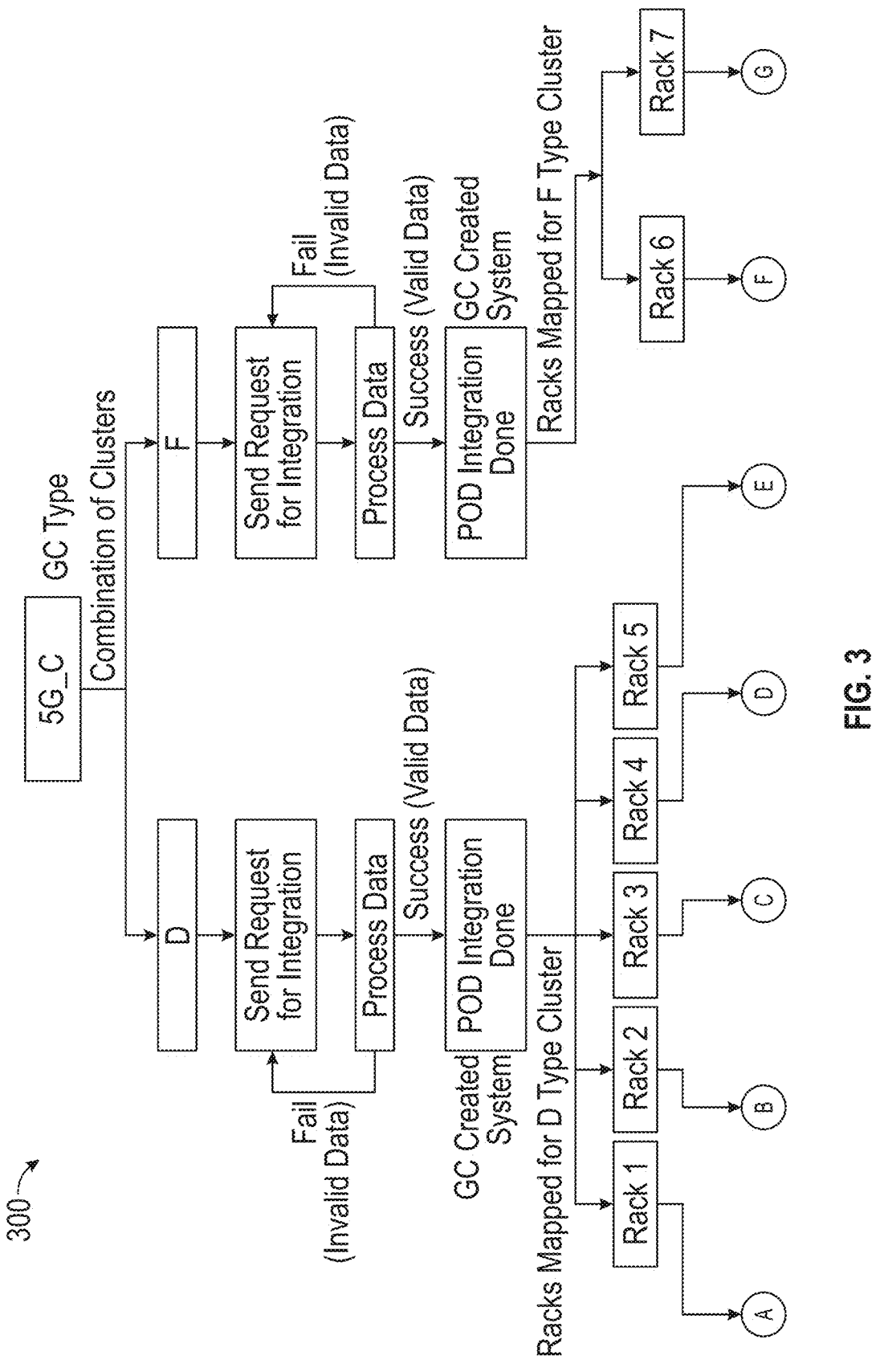
FIG. 3 is a block diagram of a data center, in accordance with some embodiments.
Figure 3:
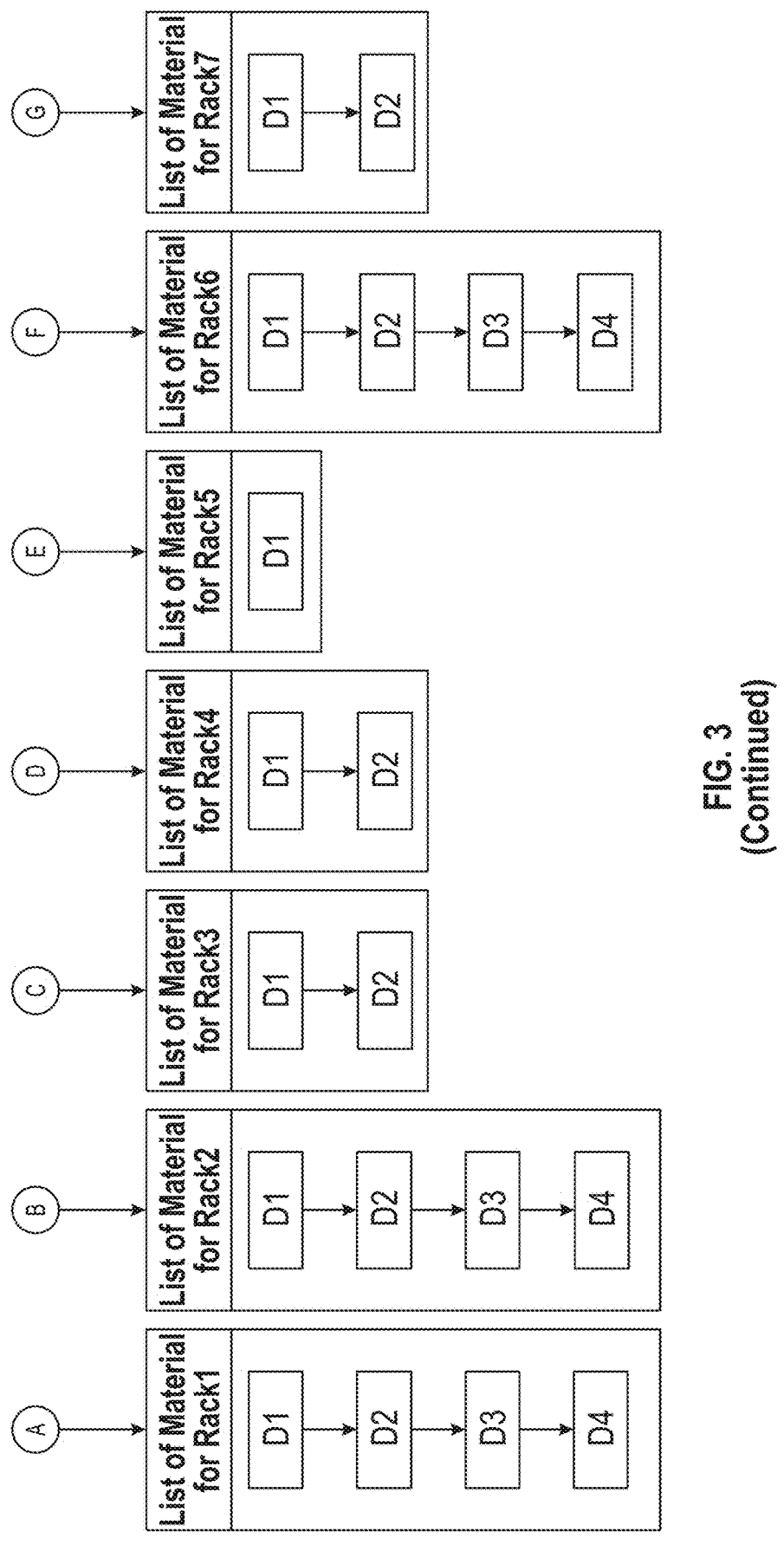

In some embodiments, outputting the predefined list includes outputting the predefined list corresponding to data center 300 as depicted in FIG. 3. As depicted in FIG. 3, data center 300 includes server cluster types D and F according to data center type 5G_C. Server cluster type D corresponds to a POD including a total of five racks, racks 1-5, and server cluster type F corresponds to a POD including a total of two racks, racks 6 and 7.

Each of racks 1, 2, and 6 includes a total of four device instances D1-D4, e.g., various combinations of servers, switches, etc., each of racks 3, 4, and 7 includes a total of two device instances D1 and D2, and rack 5 includes a single device instance D1.

In the embodiment depicted in FIG. 3, outputting the predefined list includes, for each server cluster type D and F, iteratively sending integration information requests and processing received data (by performing some or all of operation 240 discussed below) until valid data are received for each of the some or all of device instances D1-D4 corresponding to each of racks 1-7.

Data center 300 depicted in FIG. 3 is a non-limiting example provided for the purpose of illustration. Other data center types and configurations are within the scope of the present disclosure.

Figures 4A, 4B:
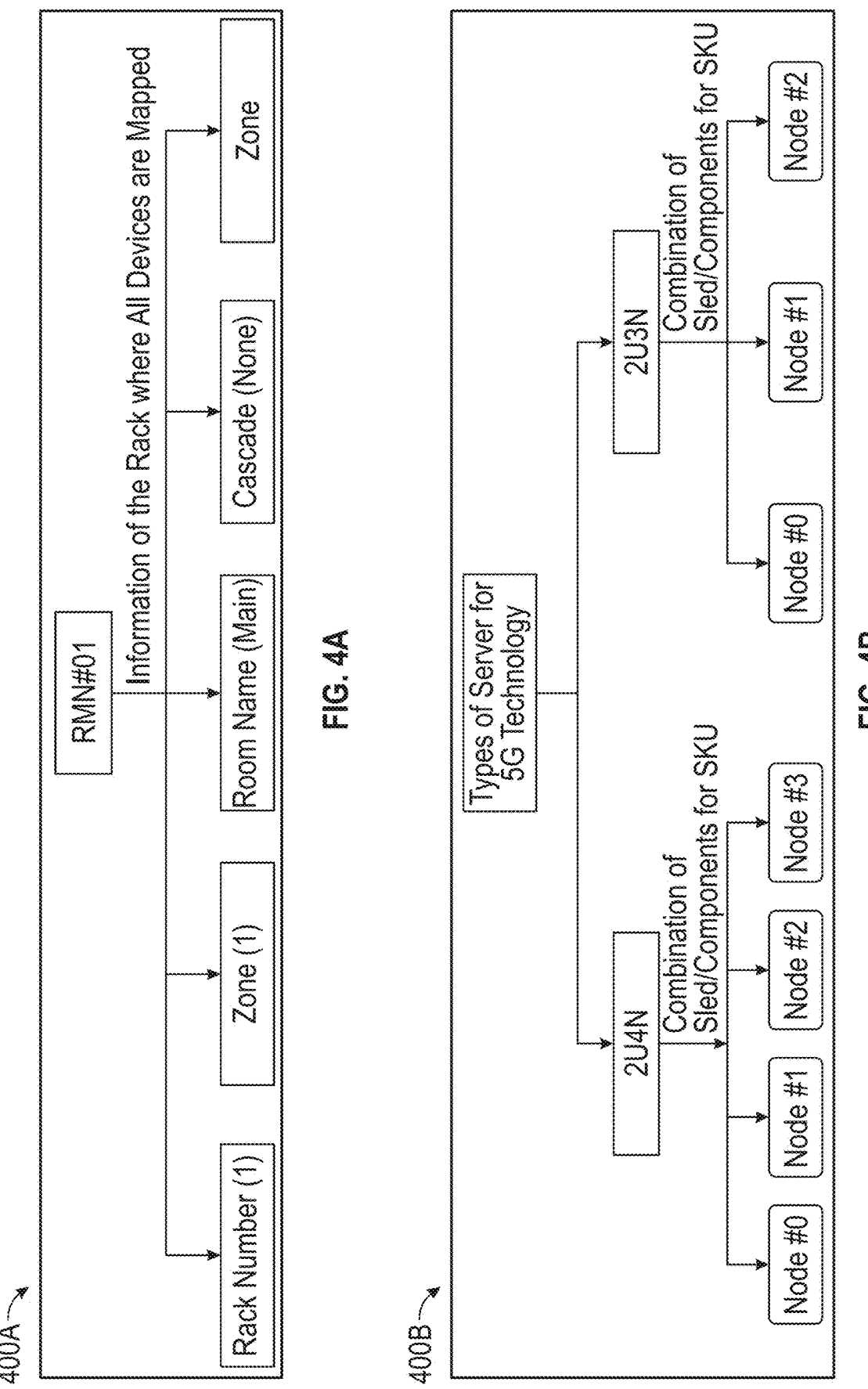
FIGS. 4A and 4B are non-limiting examples of device information, in accordance with some embodiments.

FIGS. 4A and 4B depict non-limiting examples of data center device information, in accordance with some embodiments. FIG. 4A depicts rack information 400A and FIG. 4B depicts server information 400B.

Rack information 400A includes a rack name RMN #01, a rack number identifier, first and second data center zone identifiers, a data center room name identifier, and a cascade option indicator.

Server information 400B includes types of servers corresponding to 5G technology. A server type 2U4N includes a total of four nodes, node 0-3, and a server type 2U3N includes a total of three nodes, node 0-2. Each server type corresponds to a sever name sku and each node corresponds to a single large expensive disk (SLED) or other component of the corresponding server type.

Each of rack information 400A and server information 400B depicted in respective FIGS. 4A and 4B is a non-limiting example provided for the purpose of illustration. Other data center device information types and configurations are within the scope of the present disclosure.

FIGS. 6-7C depict non-limiting examples of respective GUIs 600-700C usable for outputting the predefined list, in accordance with some embodiments. Each of GUIs 600-700C is further usable for performing some or all of operations 240-270 as discussed below.

GUI 600 corresponds to data center mapping information including top-level headings and entries for material names MN, material codes MC, host names HN, serial numbers SN, MAC addresses MAC, rack names RM009, and a rack number 9. GUI 600 also includes SLED-level headings and entries for material names MN, chassis serial numbers SN, component names S5i sled, sled numbers NODE #0-NODE #3, host names HN, serial numbers SN, BMC MAC addresses MAC, rack names RM009 and RM #010, rack numbers 9 and 10, and a status registered.

GUI 700A corresponds to data center mapping information including POD details PODINFO, OOB, TOR, CVIM, and OPENSTACK, host names HN, serial numbers SN, MAC addresses MAC, switch types EDGE_TOR_SWITCH and FH_TOR_SWITCH, and management and gateway IP addresses IP.

GUI 700B corresponds to data center mapping information including four instances of server information including status Draft, physical hostnames HN, physical rack numbers 3 and 4, logical rack numbers 1, rack slot numbers 4 and 22, sled numbers 0-2, and MAC addresses MAC.

GUI 700C corresponds to data center mapping information including four instances of switch information including status Planned, host names HN, NE type SWITCH, domain type TRANSPORT, and vendor name VN.

Each of GUIs 600-700C depicted in respective FIGS. 6-7C is a non-limiting example provided for the purpose of illustration. Other GUI types and configurations are within the scope of the present disclosure.

At operation 240, mapping information including one or more identifiers of material installed in the data center is received. Receiving the mapping information includes receiving the mapping information in response to and structured in accordance with the predefined list output in operation 230. In some embodiments, receiving the mapping information includes receiving some or all of mapping information 126 discussed above with respect to FIGS. 1A and 1B.

In some embodiments, receiving the mapping information includes performing one or more validation operations, e.g., confirming a formatting, numeric range, inclusion in a database or other reference, or the like.

Receiving the mapping information includes receiving one or more user inputs through a GUI, e.g., from user 140 through GUI 128 discussed above with respect to FIGS. 1A and 1B, or through one or more of GUIs 600-700C discussed above with respect to FIGS. 6-7C.

At operation 250, the mapping information is stored in a storage device. In some embodiments, storing the mapping information in the storage device includes storing mapping information 126 in storage device 124 discussed above with respect to FIGS. 1A and 1B.

At operation 260, in some embodiments, some or all of the stored mapping information is output to an external device. In various embodiments, outputting some or all of the stored mapping information includes outputting some or all of the stored mapping information to a network manage- ment system (NMS) configured to manage a communication system, e.g., system 100 discussed above, a device including an orchestrator, or other suitable device.

In some embodiments, outputting some or all of the stored mapping information includes outputting some or all of data center mapping information 126 from storage device 124 discussed above with respect to FIGS. 1A and 1B.

In some embodiments, outputting some or all of the stored mapping information includes outputting some or all of data center mapping information formatted as a payload of one or more data packets.

In some embodiments, outputting some or all of the stored mapping information includes outputting a trigger to the external device, the trigger being configured to cause the external device to perform one or more operations directed to commissioning some or all of the data center, e.g., one or more PODs of the data center, thereby activating the some or all of the data center as an element of a communication system, e.g., system 100 discussed above with respect to FIGS. 1A and 1B.

Figure 5:
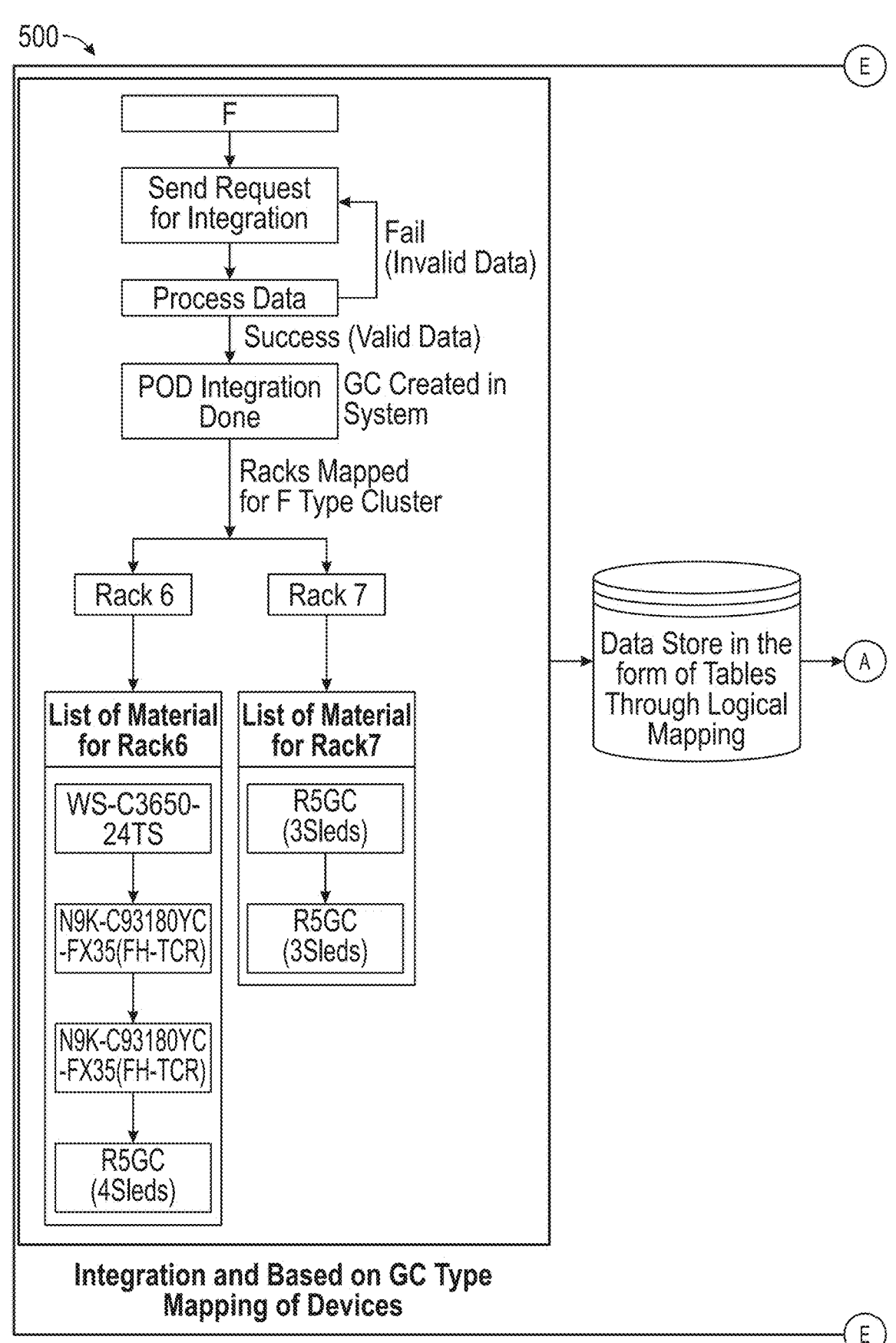
FIG. 5 depicts a data center commissioning process, in accordance with some embodiments.
Figure 5:
Figure 5:
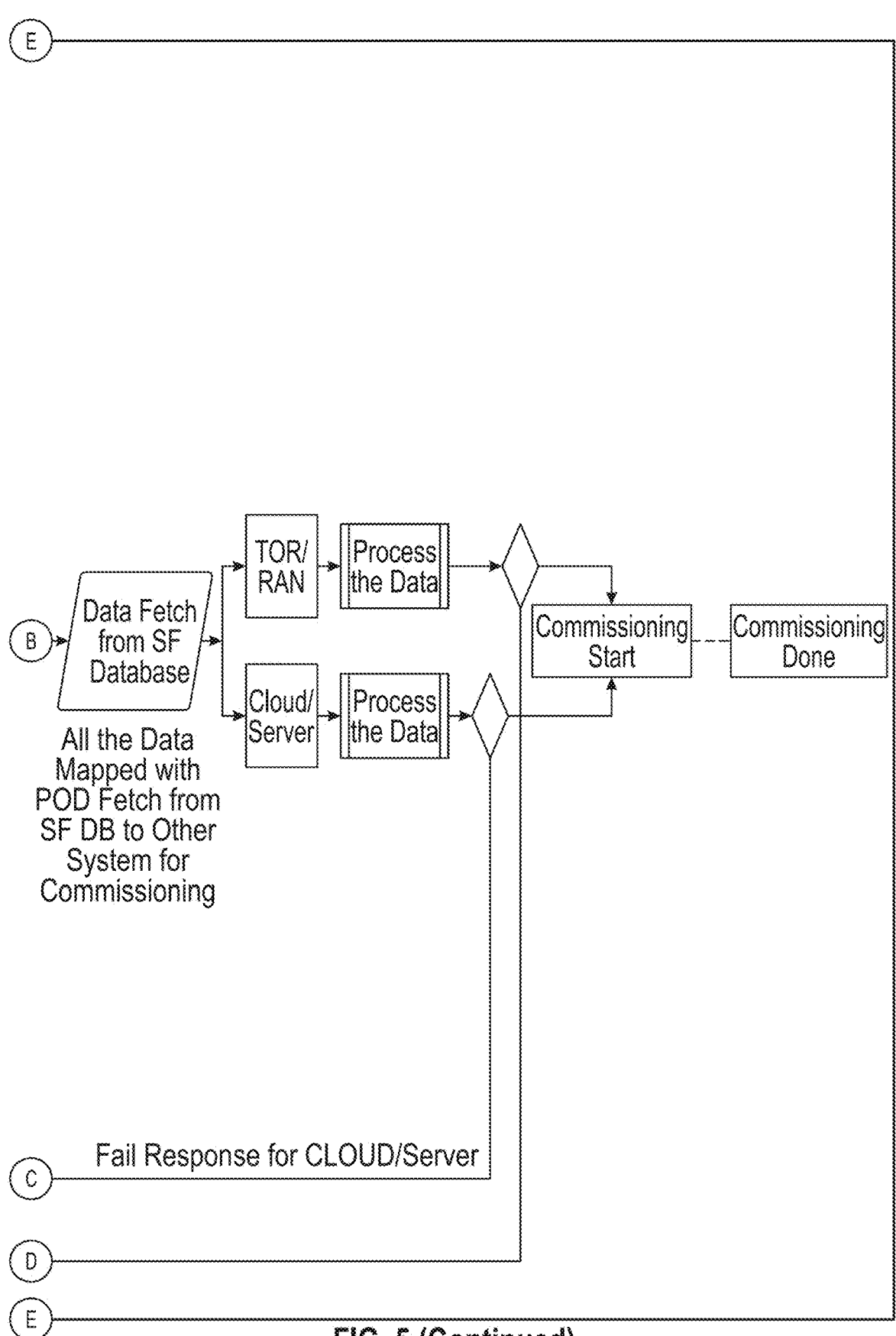

FIG. 5 depicts a data center commissioning process 500, in accordance with some embodiments. Data center com- missioning process 500 includes integration and mapping of devices corresponding to operations 210-240, storing data in the form of tables corresponding to operation 250, and additional commissioning sequences corresponding to operation 260 and operation 270 discussed below.

In the embodiment depicted in FIG. 5, a request for commissioning includes a trigger sent to another system based on a selected POD in the stored data center mapping information. In some embodiments, the request for commis- sioning includes a request based on a technology level, e.g. a 4G or 5G technology. In some embodiments, the request uses an application programming interface (API).

In the embodiment depicted in FIG. 5, the request for commissioning includes separate requests for a TOR/RAN material category and a CLOUD/server material category, and the external device is configured to perform separate validation operations on the output data center mapping information.

Data center commissioning process 500 depicted in FIG. 5 is a non-limiting example provided for the purpose of illustration. Other data center commissioning process types and sequences are within the scope of the present disclosure.

At operation 270, in some embodiments, a response from the external device is received. In some embodiments, receiving the response to the request from the external device includes receiving an indication of success or failure of the request to commission the data center. In some embodiments, receiving the response to the request from the external device includes the response including an indicator of success or failure based on one material category of a plurality of material categories corresponding to the map- ping information, e.g., one of the TOR/RAN or CLOD/ server material categories discussed above with respect to FIG. 5.

In some embodiments, receiving the response to the request from the external device includes displaying the response on a user interface, e.g., GUI 128 discussed above with respect to FIGS. 1A and 1B.

By executing some or all of the operations of method 200, data center information is automatically configured, obtained, stored, and in some embodiments output to an external device. A communication system, e.g., system 100 discussed above, including one or more devices configured to execute some or all of method 200 is thereby capable of automated networking operations so as to improve system efficiency compared to other approaches, as discussed above.

FIG. 8 is a functional block diagram of a computer or processor-based device 800 upon which or by which an embodiment is implemented.

Processor-based device 800 is programmed to facilitate automated data center mapping operations, as described herein, and includes, for example, bus 808, processing circuitry 802, also referred to a processor 802 in some embodiments, and memory 804 components.

In some embodiments, processor-based device 800 includes a communication mechanism such as bus 808 for transferring information and/or instructions among the com- ponents of processor-based device 800. Processing circuitry 802 is connected to bus 808 to obtain instructions for execution and process information stored in, for example, memory 804. In some embodiments, processing circuitry 802 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of processing cir- cuitry 802. Similarly, an ASIC is configurable to perform specialized functions not easily performed by a more gen- eral-purpose processor. Other specialized components to aid in performing the functions described herein optionally include one or more field programmable gate arrays (FPGA), one or more controllers, or one or more other special-purpose computer chips.

In one or more embodiments, processing circuitry (or multiple processors) 802 performs a set of operations on information as specified by a set of instructions stored in memory 804 related to network application implementation. The execution of the instructions causes the processor to perform specified functions.

Processing circuitry 802 and accompanying components are connected to memory 804 via bus 808. Memory 804 includes one or more of dynamic memory (e.g., RAM, magnetic disk, writable optical disk, or the like) and static memory (e.g., ROM, CD-ROM, or the like) for storing executable instructions that when executed perform the operations described herein to facilitate automated network configuration. In some embodiments, memory 804 also stores the data associated with or generated by the execution of the operations, e.g., mapping information 820 which corresponds to data center mapping information 126 dis- cussed above with respect to FIGS. 1-7C and is therefore not further discussed.

In one or more embodiments, memory 804, such as a random-access memory (RAM) or any other dynamic stor- age device, stores information including processor instruc- tions for facilitating network application implementation. Dynamic memory allows information stored therein to be changed. RAM allows a unit of information stored at a location called a memory address to be stored and retrieved independently of information at neighboring addresses. Memory 804 is also used by processing circuitry 802 to store temporary values during execution of processor instructions. In various embodiments, memory 804 includes a read only memory (ROM) or any other static storage device coupled to bus 808 for storing static information, including instructions, that is not capable of being changed by processing circuitry 802. Some memory is composed of volatile storage that loses the information stored thereon when power is lost. In some embodiments, memory 804 includes a non-volatile (persistent) storage device, such as a magnetic disk, optical disk, or flash card, for storing information, including instructions, that persists even when device 800 is turned off or otherwise loses power.

The term "computer-readable medium" as used herein refers to any medium that participates in providing information to processing circuitry 802, including instructions 806 for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer reads. The term computer-readable storage medium is used herein to refer to a computer-readable medium.

Instructions 806 include a data center mapping 816 which corresponds to data center mapping 122 discussed above with respect to FIGS. 1-7C and is therefore not further discussed. Instructions 806 also include a user interface 818, one or more sets of instructions configured to allow effective operation and control of device 800 by a user. In some embodiments, user interface 818 is configured to operate though one or more layers, including a human-machine interface (HMI) that interfaces machines with physical input hardware such as keyboards, mice, or game pads, and output hardware such as computer monitors, speakers, printers, and other suitable user interfaces.

The foregoing outlines features of several embodiments so that those skilled in the art better understand the aspects of the present disclosure. Those skilled in the art appreciate that they readily use the present disclosure as a basis for designing or modifying other processes and structures for carrying out the same purposes and/or achieving the same advantages of the embodiments introduced herein. Those skilled in the art also realize that such equivalent constructions do not depart from the spirit and scope of the present disclosure, and that they make various changes, substitutions, and alterations herein without departing from the spirit and scope of the present disclosure.

What is claimed is:

1. A method executed by a processor, the method comprising:
    receiving information corresponding to a data center, wherein
        the information comprises an identifier of a type of the data center, the data center type indicates one data center configuration of predetermined optional data center; configurations, and
        the one data center configuration indicated by the data center type comprises standardized sets of server clusters and racks associated with each server cluster;
    identifying a server cluster type according to the one data center configuration indicated by the data center type;

outputting, to a user interface, a predefined list configured to obtain mapping information, wherein the predefined list and mapping information are structured based on the identified server cluster type;
receiving the mapping information from the user interface in response to the predefined list, wherein the mapping information comprises one or more identifiers of material installed in the data center; and
storing the structured mapping information in a storage device.

2. The method of claim 1, wherein
each of the predefined list and the one or more identifiers of the material comprises server information, rack information, and networking device information.

3. The method of claim 2, wherein
the server information comprises 5G technology configuration information.

4. The method of claim 1, wherein
the receiving the mapping information comprising the one or more identifiers of material comprises receiving one or more of a hostname, a media access control (MAC) address, or a serial number.

5. The method of claim 1, further comprising
outputting some or all of the stored mapping information to an external device.

6. The method of claim 5, wherein
the outputting some or all of the stored mapping information comprises outputting a trigger to the external device to commission some or all of the data center.

7. The method of claim 6, further comprising
receiving a response to the trigger from the external device, wherein the response comprises an indicator of success or failure based on one material category of a plurality of material categories corresponding to the structured mapping information.

8. A device, comprising:
a user interface;
a memory having non-transitory instructions stored therein; and
a processor coupled to the memory, and being configured to execute the instructions, thereby causing the device to:
    receive information corresponding to a data center, wherein
        the information comprises an identifier of a type of the data center,
        the data center type indicates one data center configuration of predetermined optional data center; configurations, and
        the one data center configuration indicated by the data center type comprises standardized sets of server clusters and racks associated with each server cluster;
    identify a server cluster type according to the one data center configuration indicated by the data center type;
    output, to a user interface, a predefined list configured to obtain mapping information, wherein the predefined list and mapping information are structured based on the identified server cluster type;
    receive the mapping information from the user interface in response to the predefined list, wherein the mapping information comprises one or more identifiers of material installed in the data center; and
    store the structured mapping information in a storage device.

9. The device of claim 8, wherein each of the predefined list and the one or more identifiers of the material comprises server information, rack information, and networking device information.

10. The device of claim 9, wherein the server information comprises 5G technology configuration information.

11. The device of claim 8, wherein the instructions further cause the device to:

receive the one or more identifiers of material comprising one or more of a hostname, a media access control (MAC) address, or a serial number.

12. The device of claim 8, wherein the instructions further cause the device to:

output some or all of the stored mapping information to an external device.

13. The device of claim 12, wherein the instructions further cause the apparatus to:

output some or all of the stored mapping information as part of outputting a trigger to the external device to commission some or all of the data center.

14. The device of claim 13, wherein the instructions further cause the device to:

receive a response to the trigger from the external device, wherein the response comprises an indicator of success or failure based on one material category of a plurality of material categories corresponding to the structured mapping information.

15. A non-transitory computer-readable e medium including instructions executable by a controller of a device to cause the controller to perform operations comprising:

receiving information corresponding to a data center, wherein the information comprises an identifier of a type of the data center, the data center type indicates one data center configuration of predetermined optional data center; configurations, and the one data center configuration indicated by the data center type comprises standardized sets of server clusters and racks associated with each server cluster;

identifying a server cluster type according to the one data center configuration indicated by the data center type;

outputting, to a user interface, a predefined list configured to obtain mapping information, wherein the predefined list and mapping information are structured based on the identified server cluster type;

receiving the mapping information from the user interface in response to the predefined list, wherein the mapping information comprises one or more identifiers of material installed in the data center; and storing the structured mapping information in a storage device.

16. The non-transitory computer-readable medium of claim 15, wherein the instructions are executable by the controller of the device to cause the controller to output the predefined list and receive the one or more identifiers of the material comprising server information, rack information, and networking device information.

17. The non-transitory computer-readable medium of claim 16, wherein the instructions are executable by the controller of the device to cause the controller to receive the server information comprising 5G technology configuration information.

18. The non-transitory computer-readable medium of claim 15, wherein the instructions are executable by the controller of the device to cause the controller to receive the one or more identifiers of material comprising one or more of a hostname, a media access control (MAC) address, or a serial number.

19. The non-transitory computer-readable medium of claim 15, wherein the instructions are executable by the controller of the device to cause the controller to output some or all of the stored mapping information to an external device.

20. The non-transitory computer-readable medium of claim 19, wherein the instructions are executable by the controller of the device to cause the controller to output the some or all of the stored mapping information included in a trigger to the external device to commission some or all of the data center.

\* \* \* \* \*